(12) United States Patent
Zuo et al.

(10) Patent No.: US 12,526,554 B2
(45) Date of Patent: Jan. 13, 2026

(54) METHOD TO IMPROVE PIXEL FAILURE COVERAGE IN GLOBAL SHUTTER IMAGE SENSOR

(71) Applicant: OmniVision Technologies, Inc., Santa Clara, CA (US)

(72) Inventors: Liang Zuo, Milpitas, CA (US); Zhenfu Tian, San Jose, CA (US); Jiayu Guo, Milpitas, CA (US); Dennis Lee, San Jose, CA (US); Zhiqiang Song, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 127 days.

(21) Appl. No.: 17/940,872

(22) Filed: Sep. 8, 2022

(65) Prior Publication Data

US 2024/0089639 A1    Mar. 14, 2024

(51) Int. Cl.
*H04N 25/79*    (2023.01)
*H04N 25/69*    (2023.01)
*H04N 25/75*    (2023.01)

(52) U.S. Cl.
CPC ............. *H04N 25/79* (2023.01); *H04N 25/69* (2023.01); *H04N 25/75* (2023.01)

(58) Field of Classification Search
CPC ......... H04N 25/79; H04N 25/68; H04N 25/75
See application file for complete search history.

(56) References Cited

U.S. PATENT DOCUMENTS 11,070,754 B1 *   7/2021   Zhang ................. H04N 25/626

* cited by examiner

*Primary Examiner* — Lin Ye
*Assistant Examiner* — Fayez A Bhuiyan
(74) *Attorney, Agent, or Firm* — COZEN O'CONNOR (57) ABSTRACT

A global shutter image sensor with improved pixel failure coverage detects failures caused by the pixel chip of the image sensor. The global shutter image sensor includes a pixel chip including an array of photodiodes and associated logic, and a logic chip, bonded to the pixel chip, including an array of logic blocks for processing the images detected by the photodiodes. A failure detection circuit coupled to a reference voltage node of the image sensor detects a failure in the pixel chip by capturing a first level of pixel bias current and a second level of pixel bias current wherein a difference between the first level and the second level drives an output of the failure detection circuit either as logic high or as logic low.

16 Claims, 5 Drawing Sheets

METHOD TO IMPROVE PIXEL FAILURE COVERAGE IN GLOBAL SHUTTER IMAGE SENSOR

BACKGROUND

Image sensors having global electronic shutters are useful for high-speed photography. These image sensors may copy charge from many pixels simultaneously (or nearly simultaneously) into image storage capacitors, then read these image storage capacitors to image processing circuitry sequentially. By using a full-frame reset ending at the start of a shutter interval, followed by copying charge from pixels of an entire image into image storage capacitors at the end of the shutter interval, an image is captured undistorted by movement of a subject as the shutter interval begins and ends.

In some cameras, a high-speed burst of resets, followed by a high-speed burst of reads performed at the end of a shutter interval, can provide images with little if any distortion due to movement as the shutter interval ends.

With the increasing use of image sensors for automotive navigation and self-driving applications, standard safety requirements have been developed. The Automotive Safety Integrity Level (ASIL) is a risk classification scheme used for defining levels of safety in the automotive industry. Automotive devices are classified as ASIL A, ASIL B, ASIL C or ASIL D, with ASIL D dictating the highest integrity requirements on the product and ASIL A the lowest. Levels are established by performing a risk analysis of a potential hazard by looking at the Severity, Exposure and Controllability of the vehicle operating scenario.

In order to achieve ASIL D level, each individual circuit block in an image sensor used in automotive applications should have a failure detection mechanism that detects operational failure including, for example, a) signal stuck low/high, b) signal transient fault, and c) under-voltage/over-voltage. Failure to detect such faults may lead to image quality degradation or image corruption, and cause unsafe operation of a vehicle.

SUMMARY

In an embodiment, a global shutter image sensor includes a pixel chip including an array of pixel blocks each comprising a photodiode and plurality of gates; a logic chip, bonded to the pixel chip, including an array of logic blocks corresponding to the array of pixel blocks, each logic block comprising an image storage capacitor for receiving image charge from the photodiode as controlled by the plurality of gates; and a failure detection circuit coupled to a reference voltage node of the image sensor, the failure detection circuit detecting a failure in the pixel chip by capturing a first level of pixel bias current and a second level of pixel bias current wherein a difference between the first level and the second level drives an output of the failure detection circuit either as logic high or as logic low.

In an embodiment, a method of detecting a failure in a global shutter image sensor includes capturing a leakage current and a first level of a pixel-bias current at a reference voltage node of the global shutter image sensor with a first transistor during a first time period; closing a switch to mirror the captured leakage current and first level of a pixel-bias current to a second transistor during the first time period; opening the switch during a second time period; capturing the leakage current and a second level of the pixel-bias current at the reference voltage node during the second time period; comparing the difference between the first level of the pixel-bias current and the second level of the pixel-bias current; and setting a flag when the pixel-bias current passes a threshold indicating a number of faulty pixels in the global shutter image sensor.

BRIEF DESCRIPTION OF THE FIGURES

The present invention may be better understood, and its numerous objects, features and advantages made apparent to those skilled in the art by referencing the accompanying drawings. The use of the same reference number throughout the figures designates a like or similar element.

DETAILED DESCRIPTION OF THE EMBODIMENTS

In the following description, numerous specific details are set forth to provide a thorough understanding of the examples. One skilled in the relevant art will recognize that the techniques described herein can be practiced without one or more specific details, or with other methods, components, etc. In other instances, well-known structures, or operations are not shown or described in detail to avoid obscuring certain aspects of the examples.

Reference throughout this specification to "an example" or "an embodiment" means that a feature, structure, or characteristic described in connection with the example is included in at least one example of the present invention. Thus, the appearances of the phrases "in an example" or "in an embodiment" in various places throughout this specification are not necessarily all referring to the same example or embodiment. Furthermore, the features, structures, or characteristics may be combined in any suitable manner in one or more examples.

Terms such as "first", "second", and "third" are used in this specification to avoid confusion among components and do not limit the order or the like. Therefore, for example, the term "first" can be replaced with the term "second", "third", or the like as appropriate.

Throughout this specification, several terms of art are used. These terms are to take on their ordinary meaning in the art from which they come, unless specifically defined herein or the context of their use would clearly suggest otherwise. For example, the term "or" is used in the inclusive sense (e.g., as in "and/or") unless the context clearly indicates otherwise.

In embodiments, an image sensor uses voltage domain global shutter pixel technology having a pixel chip and a logic chip. Each pixel in the pixel chip includes one or more photodiodes, and RST/DFG/TX/SF/GS transistors.

The logic chip includes Vctrl_en/Shr_en/Shs_en/RS/SF_log (controlled) transistors and is connected to the pixel chip by hybrid bonding (HB), for example.

Figure 1:
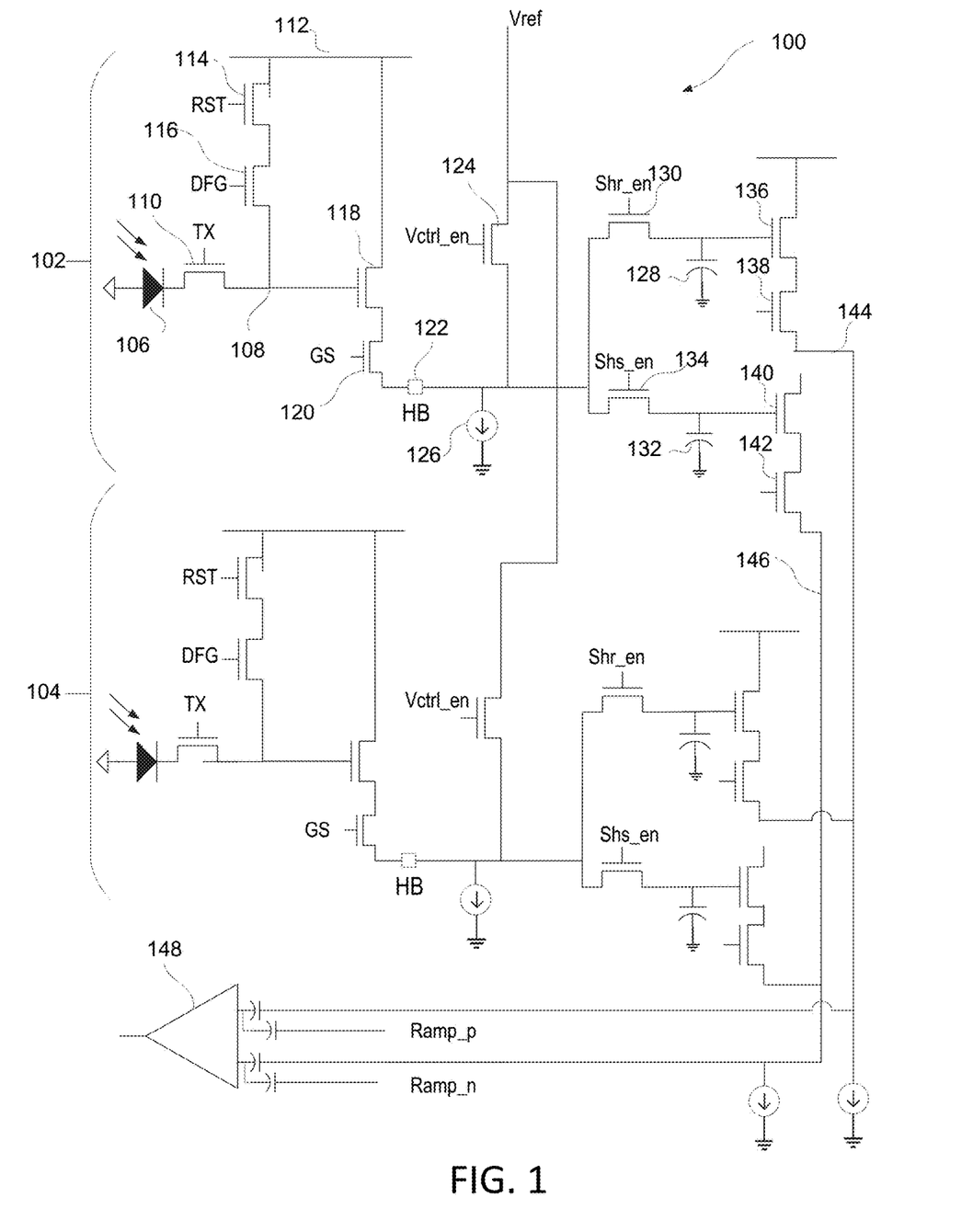
FIG. 1 is a simplified schematic diagram of a portion of a global shutter image sensor, in embodiments.

A portion of a representative global shutter image sensor 100 is shown in FIG. 1. For purposes of illustration, FIG. 1 illustrates the circuitry on a pixel chip and logic chip for two pixels, 102 and 104, which may be employed in an array of pixels for global image sensor 100. Discussion below applies to both pixels, although only one will be described.

In pixel 102, photodiode 106 is connected to floating diffusion (FD) node 108 by transfer transistor (TX) 110 which is controlled by a TX selection line. FD node 108 is connected to AVDD power line 112 through reset (RST) transistor 114 and dual floating diffusion gate (DFG) transistor 116 which selective reset photodiode 106 to a pre-defined reset level such as AVDD. FD node 108 also controls source-follower (SF) transistor 118. SF transistor 118 is coupled in series with gate selection (GS) transistor 120 to hybrid bond 122, which couples the pixel chip to the logic chip.

Hybrid bond 122 is coupled to load transistor 124 and pixel bias current source 126. Load transistor 124 is controlled by a Vctrl_en signal, described in more detail below.

The logic chip includes a sample and hold circuit for providing the global shutter operation. A first image storage capacitor (C1) 128 receives charge from photodiode 106 through first shutter transistor 130 controlled by shutter enable signal Shr_en. A second image storage capacitor (C2) 132 receives charge from photodiode 106 through second shutter transistor 134 controlled by shutter enable signal Shs_en. A second terminal of each image storage capacitor 128, 132 is grounded. Global shutter operation is provided by loading capacitors C1 128 and C2 132 across the pixel chip in one operation, then performing a sequential readout and reset of each pixel or group of pixels using transistors 136, 138, 140 and 142 to transfer voltage to ADC 144.

The first terminal of C1 capacitor 128 controls a second source-follower transistor 136, and C2 capacitor 132 controls a second SF transistor 140. The second SF transistors 136, 140 are coupled in series with selection transistors 138 and 142, respectively. The selection transistors 138, 142 are coupled to drive data lines 144 and 146, respectively, that in turn couples through additional circuitry, including for example a differential analog-to-digital converter (ADC) 148.

Figure 2:
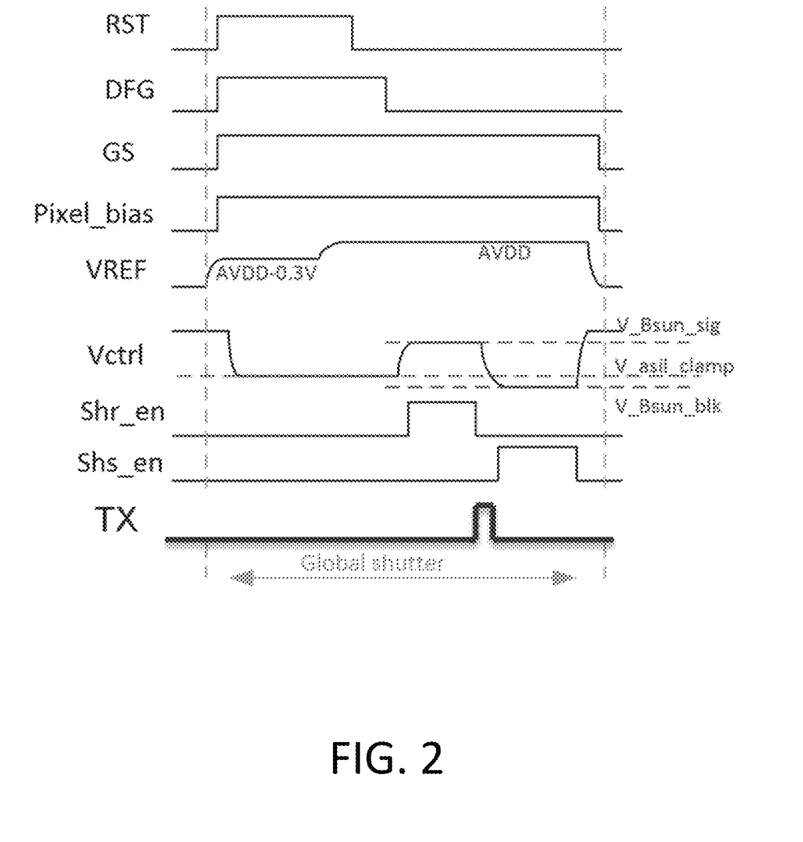
FIG. 2 is an exemplary timing operation for global charge transfer associated with global shutter image sensor 100, in an embodiment.

FIG. 2 illustrates an exemplary timing operation for global charge transfer associated with global shutter image sensor 100, in an embodiment. FIGS. 1 and 2 are best viewed together in the following discussion. During a global shutter operation, the FD reset level at FD node 108 is sampled by transistor 130 using the Shr_en signal to C1 capacitor 128. Charge from photodiode 106 is transferred to FD node 108 by transistor 110 using transfer signal TX, then, the signal level at FD node 108 is sampled by transistor 134 using the Shs_en signal to C2 capacitor 132.

Load transistor 124 is connected to Vref and controlled by Vctrl_en to address the case where there are black sun pixels by keeping voltage at hybrid bond 122 clamped by Vctrl_en to the value of V_asil_clamp. After global shutter operation, reset and signal stored on capacitors C1 and C2 are readout in rolling shutter mode row by row to column differential ADC 148.

There are several ways the pixel circuits of FIG. 1 may fail and cause image quality degradation or image corruption. For example, there may be defects in hybrid bod 122 that prevent voltages from FD node 108 from being sampled onto capacitors 128 and 132, Signals controlling transistors 114, 116 and/or 120 may be stuck low or high, or transistor gate 110 may be broken.

In order to detect as many failures caused by the pixel circuit as possible, several methods are proposed in this patent. Specifically, these methods cover the failures of most transistors on the pixel chip itself as well as the hybrid bond between the pixel chip and the logic chip.

Figure 3:
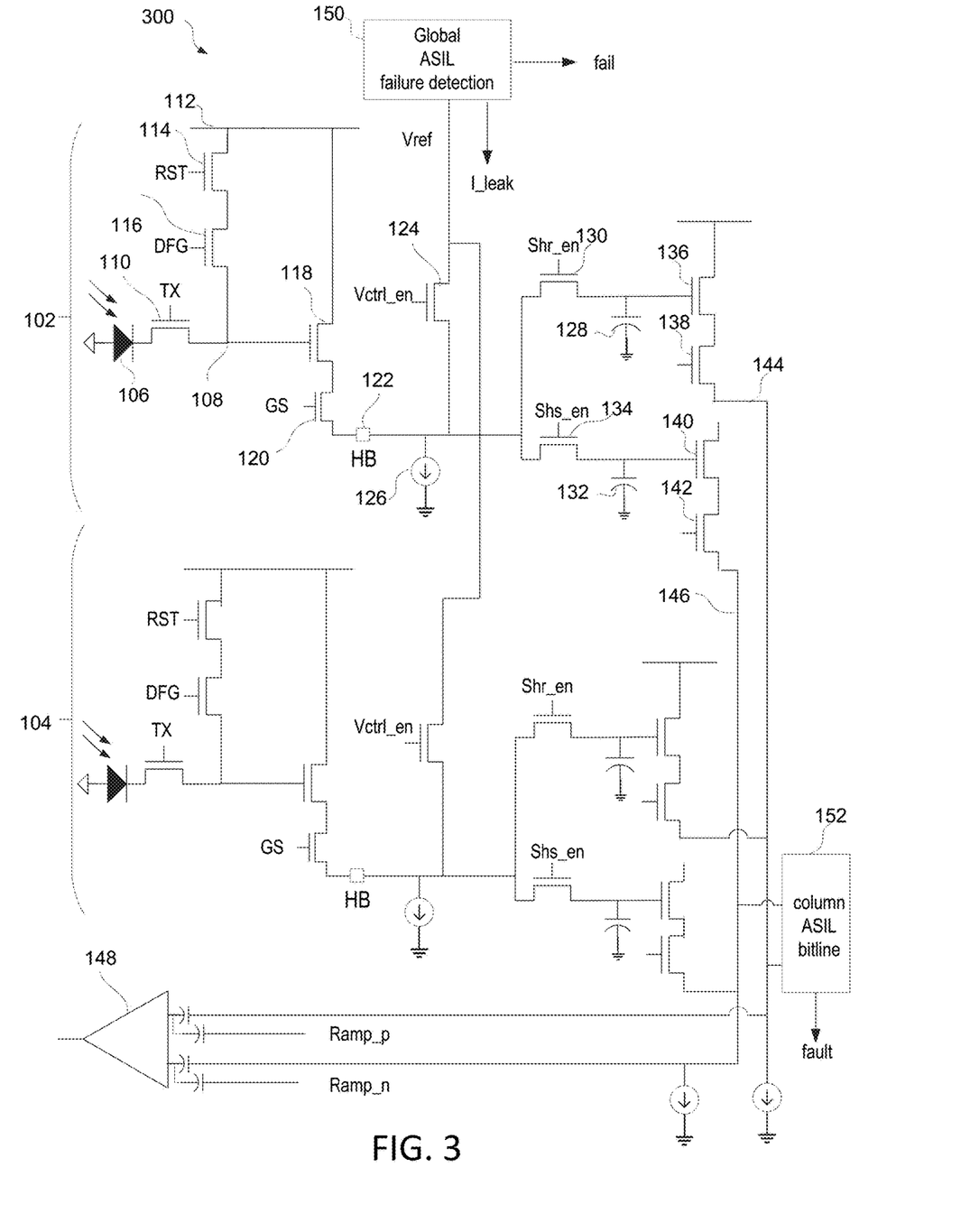
FIG. 3 is a simplified schematic diagram of the global shutter image sensor of FIG. 1 with failure detection circuitry, in embodiments.

FIG. 3 is a simplified schematic diagram of global shutter image sensor 300 with failure detection circuitry. Global shutter image sensor 300 is an example of global shutter image sensor 100. When the following descriptions involve the drawings, like numerals in different drawings represent like or similar elements unless otherwise indicated.

The failure detection circuit, or Global ASIL 150, can detect failures in each pixel circuit, such as pixels 102 and 104 of global image sensor 300, including RST/DFG/GS inputs stuck low or high as well as a broken hybrid bond (HB).

The detection operation is performed while RST/DFG/GS are set high. If any of transistors 114, 116 or 120 are fixed at low, pixel bias current 126 will flow through Vctrl_en transistor 124 by setting Vctrl_en to a certain low level and thus generating a fault signal. The level set for Vctrl_en for failure detection will not interfere with normal pixel operation. Likewise, if HB 122 is broken (open circuit), pixel bias current 126 will also flow thru the Vctrl_en controlled transistor 124 and cause a "Fault" indication by Global ASIL failure detection circuit 150.

Figure 4:
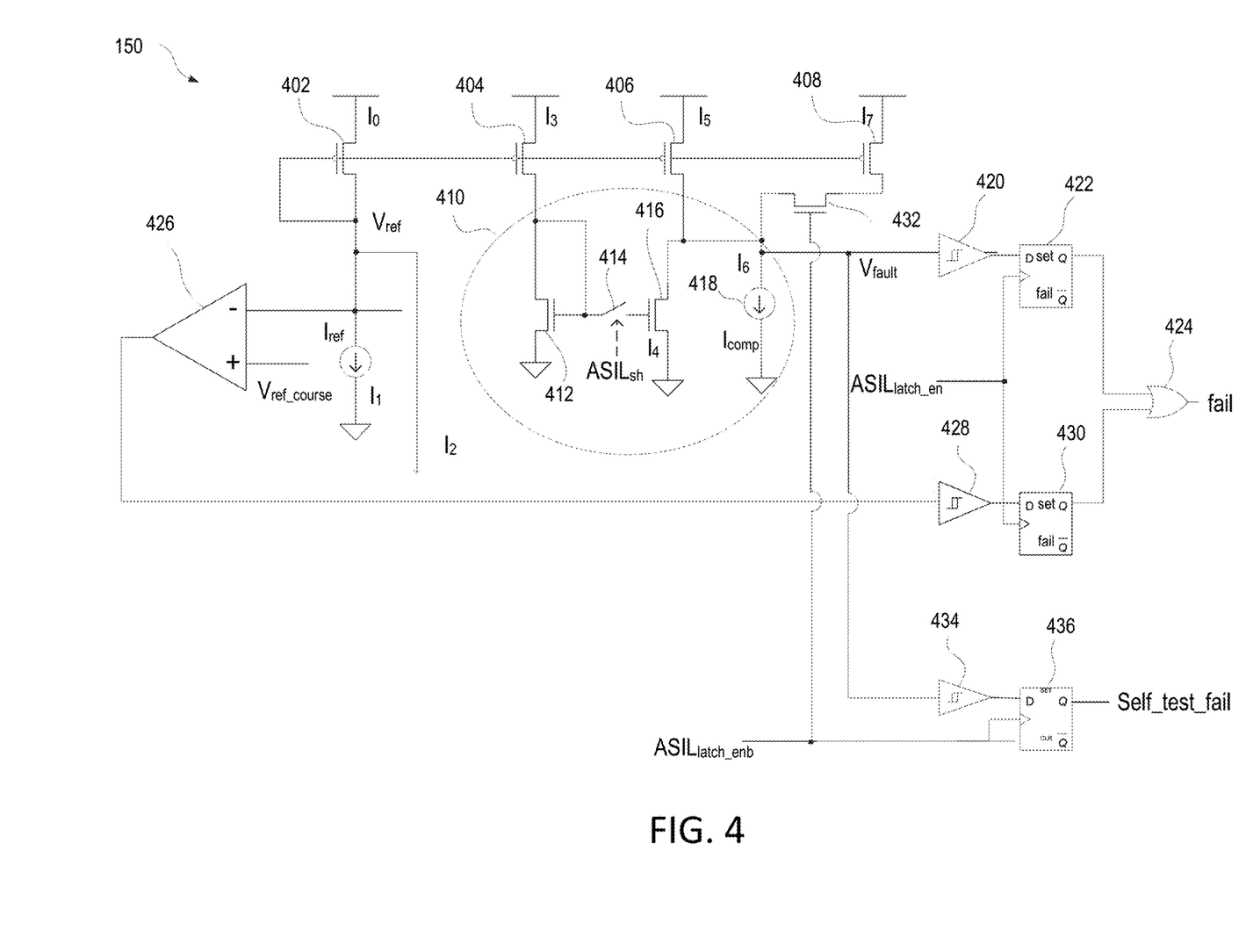
FIG. 4 is a schematic diagram of the failure detection circuitry of FIG. 3, in embodiments.
Figure 5:
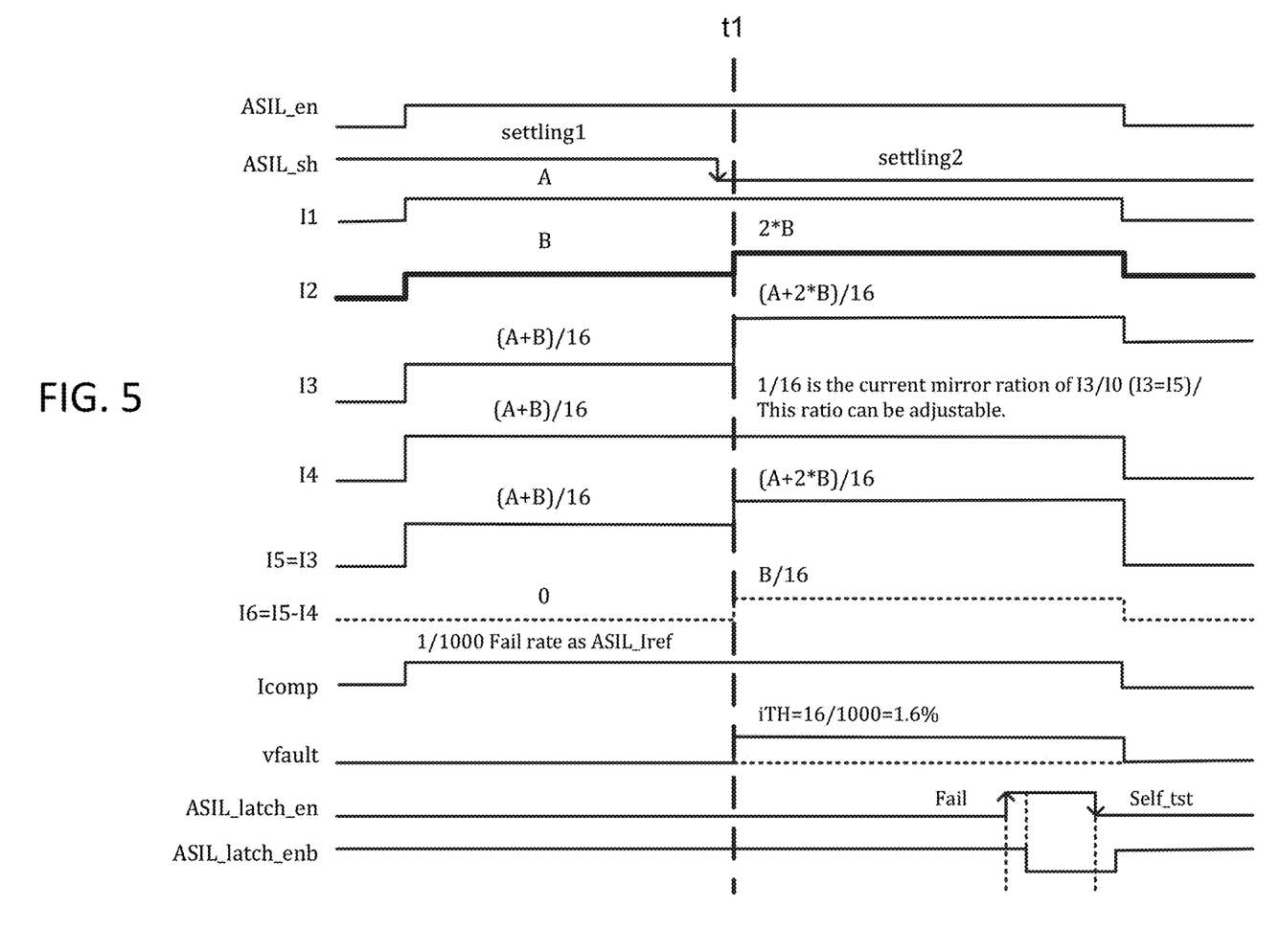
FIG. 5 is an exemplary timing operation for failure detection during a global shutter interval using the circuitry of FIG. 4.

FIG. 4 is a schematic diagram of the Global ASIL failure detection circuit 150 of FIG. 3. FIG. 5 is an exemplary timing operation for failure detection during a global shutter interval. FIGS. 4 and 5 are best viewed together in the following discussion.

A current mirror includes transistors 402, 404, 406 and 408. The source of each of transistors 402, 404, 406 and 408 is coupled to AVDD. Current $I_0$ in transistor 402 is given by $$I_0 = I_1 + I_2 \quad (1)$$

where $I_1 = I_{ref}$ and $I_2$ is the sum of the normal leakage current generated by global shutter image sensor 100 and the pixel bias current 126 at voltage reference node $V_{ref}$. Transistor 404 is a current mirror of transistor 402 wherein, in some embodiments, the current $I_3$ is a scaled value of $I_0$ given by $$I_3 = I_0/16 \quad (2)$$

More generally, $I_3$ is selectable and is determined by a ratio of the channel lengths and widths of transistors 402 and 404. Embodiments disclosed herein scale $I_0$ by a factor of 16 but other factors are possible.

Transistor 406 is a current mirror of transistor 404 with no scaling so that $$I_5 = I_3 \quad (3)$$

Since the $V_{ref}$ node is connected to the whole pixel array of global shutter image sensor 100, there may be normal leakage currents ($I_{leak}$) going to the $V_{ref}$ node which can interfere the detection of the actual faulty pixels. Sample and hold circuit 410 ($ASIL_{sh}$ to open transistor 414) is introduced to capture the leakage current ($I_{leak}$) and the pixel bias current ($I_{pix\_bias}$) caused by any defective pixels which are combined as I2 given by $$I_2 = I_{leak} + N_{err} \times I_{pix\_bias} \quad (4)$$

where $N_{err}$n is the number of faulty pixels.

Sample and hold circuit 410 includes transistor 412 which mirrors transistor 404. Switch 414 connects the gate of transistor 412 to the gate of transistor 416 so transistor 416 mirrors transistor 412 when switch 414 is closed so that current I$_4$ through transistor 416 equals current I$_3$ through transistor 412.

When switch 414 is opened, transistor 416 maintains drain current I$_4$ at a previous level. As will be described in more detail below, when switch 414 is closed, current I$_6$ and voltage fault node V$_{fault}$ is given by $$I_6 = I_5 - I_4 = 0 \quad (5)$$

When switch 414 is opened, Vctrl_en is controlled to double the pixel bias current (I$_{pix\_bias}$) to a second level so that the amount of defective pixel current is increased by the same ratio (×2) and $$I_0' = I_1 + I_2' \quad (6)$$

$$I_2' = I_{leak} + 2 \times N_{err} \times I_{pix\_bias} \quad (7)$$

Since switch 414 is open, current I$_4'$ is maintained at its previous level of I$_3$ while $$I_5' = I_3' = I_0'/16 \quad (8)$$

$$I_6' = I_5' - I_4 = I_0' - I_0/16 = N_{err} \times I_{pix\_bias}/16 \quad (9)$$

Thus, sample and hold circuit 410 captures the current difference between the first and second levels of the pixel bias current 126 (i.e. the increment defective pixel current) and compares it with with I$_{comp}$ from current source 418, which is tunable based on a preferred number of failed pixels. Once the voltage fault node V$_{fault}$ crosses the threshold of Schmitt trigger 420, flip flop 422 is set using latch enable signal ASTL$_{latch\_en}$, thus providing a failure signal to one input of OR gate 424. I$_{comp}$ current source 418 can be tuned to decide the triggering point for the failure signal, i.e. how many faulty pixels (N$_{err}$) will be allowed to trigger system error flag.

In some embodiments, a high number of pixel cell failures may result in a large current I$_2$, large enough that can pull transistor 402 and sample and hold circuit 410 out of saturation region, e.g. out of the range of current mirrors. To capture this failure, a coarse error detection is also implemented using comparator 426, which directly compares V$_{ref}$ with a tunable coarse reference voltage V$_{ref\_coarse}$. The output of comparator 426 is connected to Schmitt trigger 428 which provides an input to flip flop 430. When the comparator 426 output crosses the threshold of Schmitt trigger 428, a failure detection signal is provided through flip flop 430 to the second input of OR gate 424. V$_{ref\_coarse}$ is set to a low value such that under normal, or saturated, conditions, the output of comparator 426 is low. When I$_2$ has a value high enough to pull transistor 402 out of saturation, V$_{ref}$ goes low, below V$_{ref\_coarse}$, thus making the output of comparator 426 go high and triggering Schmitt trigger 428. When latch enable signal ASIL$_{latch\_en}$, pulses, the output of comparator 426 is latched into flip flop 430.

Either of the previous described two detections (thru OR gate 424) can trigger the fault condition and provide a failure signal from Global ASIL failure detection circuit 150 to other digital circuits.

In embodiments, a self-test structure for testing Global ASIL failure detection circuit 150 is built to intentionally insert certain amount of current using transistors 408 and 432, Schmitt trigger 434 and flip flop 436. Transistors 408 and 432 are connected in series to reference voltage fault node V$_{fault}$. In embodiments, transistor 432 is a p-channel metal-oxide semiconductor (PMOS) transistor. Current I$_{6self-test}$ at V$_{fault}$ during a self-test mode, for example, during the first frame of a global shutter readout, is given by $$I_{6self\_test} = I_5 + I_7 \quad (10)$$

Where I$_7$ is a scaled, mirrored value of I$_0$ based on channel width and length dimensions of transistor 408. When I$_{6self-test}$ is larger than I$_{comp}$ from current source 418, Schmitt trigger 434 is to triggered and flip flop 436 is set using ASIL$_{latch\_enb}$. A self_test_fail flag is sent to digital circuit. In the digital circuits, system will perform check during the first frame to see if self_test_fail flag has been set to make sure the detection circuits are functional. After that, the status of self_test_fail signal will not matter because ASIL$_{latch\_enb}$ is the inverse of ASIL$_{latch\_en}$ and thus, mutually exclusive.

FIG. 5 is an exemplary timing operation for failure detection during a global shutter pre-charge interval, in other words, when RST transistor 114, DFG transistor 116 and gate selection transistor 120 are set HIGH. If any of these transistors are stuck at a LOW level during a time period when they should be at a HIGH level, global ASIL failure detection circuit will detect this condition and generate a failure detection signal to digital circuits.

During a first time period t<t$_1$, ASIL failure detection is enabled with the signal ASIL$_{en}$. Switch 414 is closed by setting signal ASIL$_{sh}$ to HIGH and currents I$_0$, I$_1$, I$_2$, I$_3$, I$_4$, I$_5$ and I$_6$ are set according to equations (1)-(5).

At time t$_1$, switch 414 is opened by setting signal ASIL$_{sh}$ to LOW resulting in the currents according to equations (6)-(9). The signal ASIL$_{latch\_en}$ is used to latch the failure signal, while the ASIL$_{latch\_enb}$ is used for the self test operation. A delay is used to guarantee that the failure signal is latched first, followed by the self test operation.

Combinations of Features

Features described above as well as those claimed below may be combined in various ways without departing from the scope hereof. The following enumerated examples illustrate some possible, non-limiting combinations:

(A1) A global shutter image sensor includes a pixel chip including an array of pixel blocks each comprising a photodiode and plurality of gates; a logic chip, bonded to the pixel chip, including an array of logic blocks corresponding to the array of pixel blocks, each logic block comprising an image storage capacitor for receiving image charge from the photodiode as controlled by the plurality of gates; and a failure detection circuit coupled to a reference voltage node of the image sensor, the failure detection circuit detecting a failure in the pixel chip by capturing a first level of pixel bias current and a second level of pixel bias current wherein a difference between the first level and the second level drives an output of the failure detection circuit either as logic high or as logic low.

(A2) In sensor (A1), the failure detection circuit may comprise a sample and hold circuit for capturing the first level of the pixel bias current at a reference voltage node during a first time period and the second level of the pixel bias current at the reference voltage node during a second time period and generating a failure signal when a difference between the first level of pixel bias current and the second level of pixel bias current is greater than a comparison current.

(A3) In sensor (A1) or (A2), the sample and hold circuit may comprise a first transistor configured as a first mirror of a scaled value of the pixel bias current; a second transistor configured as a second mirror of a scaled value of the pixel bias current; a switch coupled between the gates of the first transistor and the second transistor for setting the current of the second transistor to follow the current of the first transistor when closed and for maintaining the current of the second transistor at a previous level when open; a comparison current source coupled to a voltage fault node at the source of the second transistor; a first Schmitt trigger coupled to the voltage fault node; and a first flip flop coupled to an output of the first Schmitt trigger.

(A4) In any of sensors (A1)-(A3), the comparison current source is tunable to determine how many faulty pixels will trigger the failure signal.

(A5) In any of sensors (A1)-(A4), the failure detection circuit may comprise a comparison circuit for comparing the voltage at the reference voltage node with a coarse reference voltage and generating a failure signal.

(A6) In any of sensors (A1)-(A5), the sensor may comprise a second Schmitt trigger coupled to an output of the comparison circuit; and a second flip flop coupled to the output of the second Schmitt trigger.

(A7) In any of sensors (A1)-(A6), the failure detection circuit may comprise an OR gate coupled to the outputs of the first and second flip flops.

(A8) In any of sensors (A1)-(A7), the coarse reference voltage is tunable.

(A9) Any of sensors (A1)-(A8), the failure detection circuit may comprise a third Schmitt trigger coupled to the voltage fault node; and a third flip flop coupled to an output of the third Schmitt trigger; wherein a latch enable signal for the third flip flop is an inverse of a latch enable signal for the first and second flip flops.

(A10) Any of sensors (A1)-(A9), the pixel chip is bonded to the logic chip with a hybrid bond and the failure detection circuit detects failure in the hybrid bond.

(B1) A method of detecting a failure in a global shutter image sensor includes capturing a leakage current and a first level of a pixel-bias current at a reference voltage node of the global shutter image sensor with a first transistor during a first time period; closing a switch to mirror the captured leakage current and first level of a pixel-bias current to a second transistor during the first time period; opening the switch during a second time period; capturing the leakage current and a second level of the pixel-bias current at the reference voltage node during the second time period; comparing the difference between the first level of the pixel-bias current and the second level of the pixel-bias current; and setting a flag when the pixel-bias current passes a threshold indicating a number of faulty pixels in the global shutter image sensor.

(B2) In method (B1), setting the threshold by tuning a comparison current based on a preferred number of faulty pixels.

(B3) In method (B1) or (B2), setting the flag may comprise coupling a voltage fault node at the source of the second transistor to a first Schmitt trigger; and coupling a first flip flop to the output of the first Schmitt trigger.

(B4) In any of methods (B1)-(B3), coupling a comparison circuit to the reference voltage node and a coarse reference voltage; coupling an output of the comparison circuit to a second Schmitt trigger; and coupling a second flip flop to the output of the second Schmitt trigger.

(B5) In any of methods (B1)-(B4), coupling an OR gate to the outputs of the first and second flip flops.

(B6) In any of methods (B1)-(B5), setting the flag may comprise coupling the voltage fault node to a third Schmitt trigger; coupling a third first flip flop to the output of the third Schmitt trigger; coupling a latch enable signal to the first and second flip flops; and coupling an inverse of the latch enable signal to the third flip flop.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A global shutter image sensor, comprising:
    a pixel chip including an array of pixel blocks each comprising a photodiode and plurality of gates;
    a logic chip, bonded to the pixel chip, including an array of logic blocks corresponding to the array of pixel blocks, each logic block comprising an image storage capacitor for receiving image charge from the photodiode as controlled by the plurality of gates; and
    a failure detection circuit coupled to a reference voltage node of the image sensor, the failure detection circuit detecting a failure in the pixel chip by capturing a first level of pixel bias current and a second level of pixel bias current wherein a difference between the first level and the second level drives an output of the failure detection circuit either as logic high or as logic low.

2. The global shutter image sensor of claim 1, wherein the failure detection circuit further comprises a sample and hold circuit for capturing the first level of the pixel bias current at a reference voltage node during a first time period and the second level of the pixel bias current at the reference voltage node during a second time period and generating a failure signal when a difference between the first level of pixel bias current and the second level of pixel bias current is greater than a comparison current.

3. The global shutter image sensor of claim 2, wherein the sample and hold circuit further comprises:
    a first transistor configured as a first mirror of a scaled value of the pixel bias current;
    a second transistor configured as a second mirror of a scaled value of the pixel bias current;
    a switch coupled between the gates of the first transistor and the second transistor for setting the current of the second transistor to follow the current of the first transistor when closed and for maintaining the current of the second transistor at a previous level when open;
    a comparison current source coupled to a voltage fault node at the source of the second transistor;
    a first Schmitt trigger coupled to the voltage fault node; and
    a first flip flop coupled to an output of the first Schmitt trigger.

4. The global shutter image sensor of claim 3, wherein the comparison current source is tunable to determine how many faulty pixels will trigger the failure signal.

5. The global shutter image sensor of claim 3, wherein the failure detection circuit further comprises a comparison circuit for comparing the voltage at the reference voltage node with a coarse reference voltage and generating a failure signal.

6. The global shutter image sensor of claim 5, further comprising:
    a second Schmitt trigger coupled to an output of the comparison circuit; and
    a second flip flop coupled to the output of the second Schmitt trigger.

7. The global shutter image sensor of claim 6, wherein the failure detection circuit further comprises an OR gate coupled to the outputs of the first and second flip flops.

8. The global shutter image sensor of claim 5, wherein the coarse reference voltage is tunable.

9. The global shutter image sensor of claim 3, wherein the failure detection circuit further comprises:
- a third Schmitt trigger coupled to the voltage fault node; and
- a third flip flop coupled to an output of the third Schmitt trigger;
- wherein a latch enable signal for the third flip flop is an inverse of a latch enable signal for the first and second flip flops.

10. The global shutter image sensor of claim 1, wherein the pixel chip is bonded to the logic chip with a hybrid bond and the failure detection circuit detects failure in the hybrid bond.

11. A method of detecting a failure in a global shutter image sensor, comprising:
- capturing a leakage current and a first level of a pixel-bias current at a reference voltage node of the global shutter image sensor with a first transistor during a first time period;
- closing a switch to mirror the captured leakage current and first level of a pixel-bias current to a second transistor during the first time period;
- opening the switch during a second time period;
- capturing the leakage current and a second level of the pixel-bias current at the reference voltage node during the second time period;
- comparing the difference between the first level of the pixel-bias current and the second level of the pixel-bias current; and
- setting a flag when the pixel-bias current passes a threshold indicating a number of faulty pixels in the global shutter image sensor.

12. The method of claim 11, further comprising setting the threshold by tuning a comparison current based on a preferred number of faulty pixels.

13. The method of claim 12, wherein setting the flag further comprises coupling a voltage fault node at the source of the second transistor to a first Schmitt trigger; and
- coupling a first flip flop to the output of the first Schmitt trigger.

14. The method of claim 13, further comprising:
- coupling a comparison circuit to the reference voltage node and a coarse reference voltage;
- coupling an output of the comparison circuit to a second Schmitt trigger; and
- coupling a second flip flop to the output of the second Schmitt trigger.

15. The method of claim 14, further comprising:
- coupling an OR gate to the outputs of the first and second flip flops.

16. The method of claim 14, wherein setting the flag further comprises:
- coupling the voltage fault node to a third Schmitt trigger;
- coupling a third first flip flop to the output of the third Schmitt trigger;
- coupling a latch enable signal to the first and second flip flops; and
- coupling an inverse of the latch enable signal to the third flip flop.

* * * * *